(12) United States Patent
Yamaguchi (10) Patent No.: US 8,623,488 B2
(45) Date of Patent: Jan. 7, 2014

(54) HONEYCOMB STRUCTURE

(75) Inventor: Shinji Yamaguchi, Aichi-prefecture (JP)

(73) Assignee: NGK Insulators, Ltd., Nagoya (JP)

( * ) Notice: Subject to any disclaimer, the term of this patent is extended or adjusted under 35 U.S.C. 154(b) by 798 days.

(21) Appl. No.: 12/406,499

(22) Filed: Mar. 18, 2009

(65) Prior Publication Data

US 2009/0246453 A1    Oct. 1, 2009

(30) Foreign Application Priority Data

Mar. 28, 2008    (JP) .................................. 2008-085416

(51) Int. Cl.
   *B32B 3/12*    (2006.01)

(52) U.S. Cl.
   USPC ........................................................ 428/116

(58) Field of Classification Search
   None
   See application file for complete search history.

(56) References Cited

U.S. PATENT DOCUMENTS

| | | | |
|---|---|---|---|
| 5,114,581 A * | 5/1992 | Goldsmith et al. ........... | 210/650 |
| 5,221,484 A | 6/1993 | Goldsmith et al. | |
| 5,346,722 A * | 9/1994 | Beauseigneur et al. ...... | 427/300 |
| 6,939,825 B1 * | 9/2005 | Ohno et al. .................. | 502/439 |
| 7,547,659 B2 * | 6/2009 | Moon et al. .................. | 502/439 |
| 8,318,286 B2 * | 11/2012 | Patchett et al. ............... | 428/117 |
| 2004/0033175 A1 * | 2/2004 | Ohno et al. .................. | 422/180 |
| 2004/0053781 A1 * | 3/2004 | Okawara ....................... | 502/304 |
| 2006/0021689 A1 | 2/2006 | Arrigoni Neri et al. | |
| 2006/0068159 A1 | 3/2006 | Komori et al. | |
| 2006/0133969 A1 * | 6/2006 | Chiffey et al. ................ | 422/168 |
| 2006/0188415 A1 * | 8/2006 | Ohno et al. ................... | 422/177 |
| 2007/0234694 A1 | 10/2007 | Miyairi et al. | |
| 2008/0292513 A1 * | 11/2008 | Miyairi ........................ | 422/180 |
| 2008/0317999 A1 * | 12/2008 | Patchett et al. ............... | 428/116 |
| 2011/0185711 A1 * | 8/2011 | Mey et al. .................... | 60/311 |

FOREIGN PATENT DOCUMENTS

| | | |
|---|---|---|
| EP | 1 598 102 A1 | 11/2005 |
| EP | 1 704 920 A1 | 9/2006 |
| JP | A-2006-036185 | 2/2006 |
| JP | Y2-2607898 | 1/2007 |
| JP | A-2007-289902 | 11/2007 |
| JP | A-2007/296512 | 11/2007 |
| WO | WO 2004/113252 A1 | 12/2004 |
| WO | WO 2008/094889 A1 | 8/2008 |

OTHER PUBLICATIONS

European Search Report dated Apr. 23, 2012 issued in European Patent Application No. 09250769.8.
Jul. 24, 2013 Office Action issued in European Patent Application No. 09250769.8.

* cited by examiner

*Primary Examiner* — David Sample
(74) *Attorney, Agent, or Firm* — Oliff & Berridge, PLC (57) ABSTRACT

A honeycomb structure includes: a porous substrate having porous partition walls separating and forming a plurality of cells functioning as fluid passages, a porous coat layer disposed on a surface of the partition walls to inhibit microparticles from entering, a surface of the coat layer having an uneven shape to increase a surface area, and plugging portions for plugging cells so that a fluid flowing into the structure from an opening portions on one end side of predetermined cells may pass through the partition walls and flows out from opening portions on the other side of the other cells to allow the gas to flow through the partition walls and the coat layers. The honeycomb structure can inhibit the pressure loss from increasing upon trapping particulate matter in exhaust gas and can effectively combust and remove the trapped particulate matter.

12 Claims, 5 Drawing Sheets

HONEYCOMB STRUCTURE

BACKGROUND OF THE INVENTION AND RELATED ART STATEMENT

The present invention relates to a honeycomb structure. More specifically, the present invention relates to a honeycomb structure capable of inhibiting pressure loss from increasing upon trapping particulate matter in exhaust gas and effectively combusting and removing the trapped particulate matter.

There is a growing requirement for removing particulate matter in exhaust gas discharged from internal combustion engines such as an automobile engine, a construction machine engine, and an industrial machine stationary engine, other burning appliances, and the like in consideration of an influence on environment. Therefore, a honeycomb structure made of ceramic or the like is widely used as a filter (diesel particulate filter: DPF) for removing particulate matter. As a DPF, there is used a filter having a structure where predetermined cells having openings on one end and plugged end portions on the other side and the other cells having plugged end portions on one end and openings on the other side are alternately disposed. When it is used, a fluid (exhaust gas) is allowed to flow into the structure from one end portion where the predetermined cells have openings, and the exhaust gas is passed through the partition walls and flow out to the other cells as a permeated fluid, which is discharged from the other end portion where the other cells are open. Thus, particulate matter in exhaust gas can be trapped and removed by the partition walls.

In addition, in the DPF, a catalyst is sometimes loaded inside pores or the like of the partition walls in order to combust and remove trapped particulate matter (see, e.g., JP-Y-2607898, JP-A-2007-289902, and JP Application 2006-36185).

SUMMARY OF THE INVENTION

In the DPF, particulate matter is trapped by partition walls when exhaust gas is passed through the pores of the partition walls. When the pore diameter of the partition walls is increased, a large amount of particulate matter enters the pores to cause clogging of the pores, thereby causing a problem of increase in pressure loss upon treating exhaust gas. On the other hand, when the pore diameter of the partition walls is decreased to make particulate matter hardly enters, increase in pressure loss due to deposition of particulate matter inside the pores can be inhibited. However, passages in the walls are narrow to cause a problem of increasing pressure loss before the particulate matter deposits.

Therefore, as the utility model described in the Patent Document 1, there can be considered a technique of two-layer structure having a coat to inhibit microparticles from entering the pores on the surface of the substrate. In this case, pressure loss before deposition of the particulate matter can be suppressed. However, particularly in the presence of a loaded catalyst, since particulate matter does not enter the pores, particulate matter is hardly brought into contact with the catalyst loaded in the pores, and combustion of the particulate matter cannot effectively be performed.

On the other hand, there have been proposed, as the invention described in the Patent Document 2, a method where the surface of the substrate is made uneven in order to positively increase a contact area between particulate matter and a catalyst, and, as the invention described in the Patent Document 3, a method where the pore diameter of the substrate is increased with forming a coat for inhibiting the particulate matter from leaking out on the surfaces of the cells on the outlet side. In any of the cases, though an effect can be admitted under conditions where particulate matter is combusted and removed, there arises a problem of increasing pressure loss due to deposit of particulate matter in the substrate under conditions where temperature of exhaust gas upon trapping particulate matter is low without combustion removal of particulate matter.

The present invention has been made in view of such problems of the prior art and aims to provide a honeycomb structure capable of inhibiting pressure loss from increasing upon trapping particulate matter in exhaust gas and effectively combusting and removing the trapped particulate matter with inhibiting pressure loss also when a small amount of particulate matter deposits.

According to the present invention, there is provided the following honeycomb structure.

[1] A honeycomb structure comprising:
a porous substrate having porous partition walls separating and forming a plurality of cells functioning as fluid passages, a porous coat layer disposed on a surface of the partition walls to inhibit microparticles from entering, a surface of the coat layer having an uneven shape to increase a surface area of the coat layer with respect to the case of a flat surface, and plugging portions for plugging cells, so that a fluid flowing into the structure from an opening portions on one end side of predetermined cells may pass through the partition walls and flows out from opening portions on the other side of the other cells to allow the gas to flow through the partition walls and the coat layers.

[2] A honeycomb structure according to [1], wherein an average height of protrusions of the uneven shape of the coat layer is 20 to 300 μm and wherein an average gap between the protrusions is 30 μm to 10 mm.

[3] A honeycomb structure according to [1] or [2], wherein the coat layer has an average pore diameter of 0.1 to 20 μm.

[4] A honeycomb structure according to any one of [1] to [3], wherein the surface area of the coat layer is 1.05 to 10 times the surface area of a sup positional plane coat layer.

[5] A honeycomb structure according to any one of [1] to [4], wherein a hydraulic diameter of the cells is 0.72 to 0.96 times a hydraulic diameter of the porous substrate.

[6] A honeycomb structure according to any one of [1] to [5], wherein the partition walls of the porous substrate has an average pore size of 1 to 100-μm.

[7] A honeycomb structure according to any one of [1] to [6], wherein a catalyst is loaded on a surface of the coat layer.

[8] A honeycomb structure according to any one of [1] to [7], having a relation of A<B where A is a total area of a cross section perpendicular to the longitudinal direction of the predetermined cells having plugged end portions on one side and where B is a total area of a cross section perpendicular to the longitudinal direction of the other cells having plugged end portions on the other side.

[9] A honeycomb structure according to any one of [1] to [8], wherein a cross section perpendicular to the longitudinal direction of the predetermined cells having plugged end portions on one side has a different shape from that of a cross section perpendicular to the longitudinal direction of the other cells having plugged end portions on the other side.

A honeycomb structure of the present invention is provided with a porous coat layer for inhibiting microparticles from entering on the surface of the partition walls, and the surface of the coat layer has an uneven shape for increasing surface area of the surface of the coat layer. Therefore, when combusting and removing the trapped particulate matter contained in exhaust gas with loading a catalyst on a surface of the coat layer, the particulate matter can be trapped on the surface of the coat layer to inhibit the particulate matter from entering the pores of the coat layer and the partition walls, thereby suppressing increase in pressure loss. Further, since the surface area of the coat layer is increased due to an uneven structure of the coat layer, a sufficient amount of a catalyst loaded on the surface of the coat layer can be secured, and particulate matter trapped at the surface of the coat layer can effectively be combusted and removed.

REFERENCE NUMERALS

1: porous substrate, 2, 5, 5a, 5b: cell, 3, 6: partition wall, 7: plugging material, 11: coat layer, 11p: coat layer in a projection view, 12, 12a, 12b, 12c, 12d, 12e, 12f, 12g: protrusion, 12p: protrusion in a projection view, 13: top, 13p: top in a projection view, 21: space inside a protrusion, 22: porous article, 23: protrusion of a partition wall, 24: mountain portion of a partition wall, 31: hydraulic diameter, 100: honeycomb structure, H: height, Ha: height in a projection view

DESCRIPTION OF PREFERRED EMBODIMENT

Embodiments for carrying out the present invention will hereinbelow be described specifically. However, the present invention is by no means limited to the following embodiments, and it should be understood that changes, improvements, or the like of the design may suitably be made on the basis of ordinary knowledge of a person of ordinary skill within the range of not deviating from the gist of the present invention.

Figure 1A:
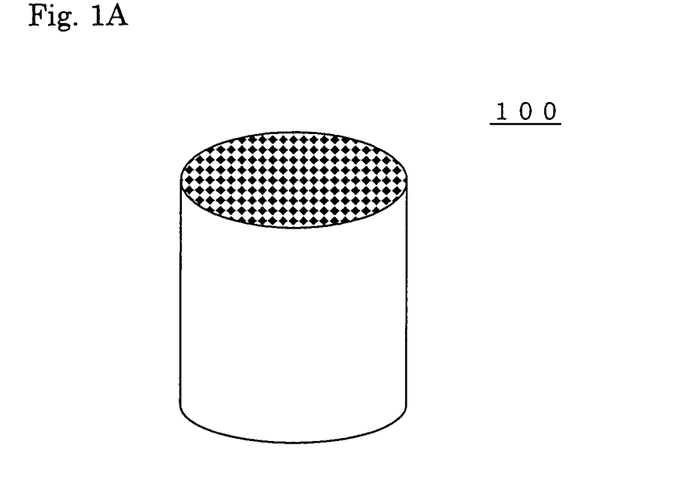
FIG. 1A is a perspective view schematically showing one embodiment of a honeycomb structure of the present invention.
Figure 1B:
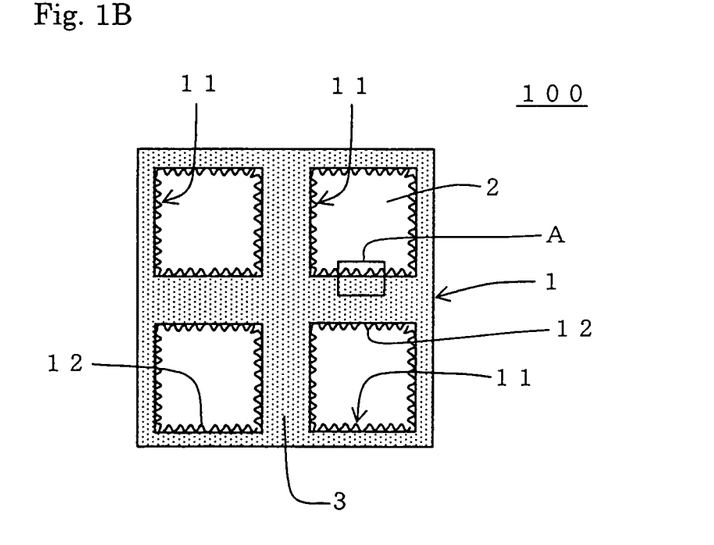
FIG. 1B is a schematic view showing a part of a cross section perpendicular to the central axial direction of an embodiment of a honeycomb structure of the present invention.
Figure 2A:
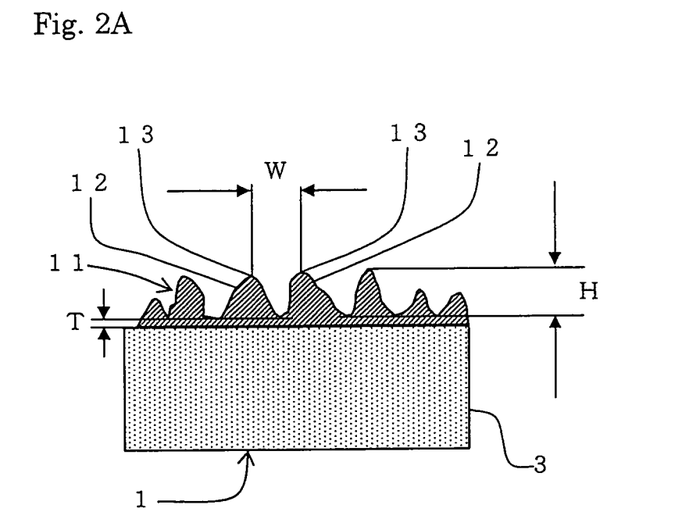
FIG. 2A is a schematic view showing an enlarged region A in FIG. 1B.

As shown in FIGS. 1A, 1B, and 2A, one embodiment of a honeycomb structure of the present invention is provided with a porous substrate 1 having porous partition walls 3 separating and forming a plurality of cells 2 functioning as fluid passages and porous coat layer 11 disposed on a surface of the partition walls to inhibit microparticles from entering. A surface of the coat layer has an uneven shape to increase a surface area of the coat layer with respect to the case of a flat surface, and the honeycomb structure is provided with plugging portions in one end portions of predetermined cells and the other end portions of the other cells to allow the gas to flow through the partition walls and the coat layer. Here, "inhibit microparticles from entering" means that microparticles do not clog the gas flow passage inside the substrate and shows that the gas flow passages are secured with no rise in pressure loss though there is a case of a closed pore where the gas flow stagnates or a case that microparticles adhere to a wall face of a pore. In addition, an "uneven shape to increase a surface area" means a shape of undulations, protrusions, and depressions which increase a microparticle deposition area of the porous coat layer itself. An uneven shape by a particle of a constituent for a coat layer or a needle crystal itself does not fall under the "uneven shape to increase a surface area" because the piece itself is not porous. In a honeycomb structure 100 of the present embodiment, an average height of protrusions 12 of the uneven shape of the coat layer 11 is preferably 20 to 300 μm, and an average interval (average of interval W) between the protrusions 12 and 12 is preferably 30 μm to 10 mm. In addition, the coat layer 11 has an average pore diameter of preferably 0.1 to 20 μm. FIG. 1A is a perspective view schematically showing one embodiment of a honeycomb structure of the present invention, FIG. 1B is a schematic view showing a part of a cross section perpendicular to the central axial direction of an embodiment of a honeycomb structure of the present invention, and FIG. 2A is a schematic view showing an enlarged region A in FIG. 1B.

Figure 2B:
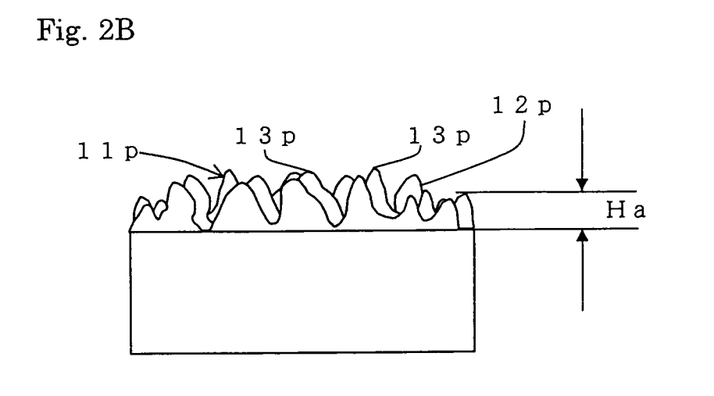
FIG. 2B is a projection view of a coat layer surface projected on a plane perpendicular to the central axis of a honeycomb structure of an embodiment of a honeycomb structure of the present invention.

In a honeycomb structure 100 of the present embodiment, an average height of protrusions 12 is preferably 20 to 300 μm, more preferably 30 to 150 μm, and particularly preferably 50 to 100 μm. When it is below 20 μm, a surface area of the coat layer 11 is hardly increased, and only a small amount of catalyst can be loaded lest the depressions should be filled with the catalyst, which may cause an insufficient loaded amount of the catalyst on the surface of the coat layer. When it is above 300 μm, pressure loss when exhaust gas flows inside the cells 2 of the honeycomb structure 100 may increase. The height H of the protrusion 12 is a height (distance) from the bottom of the depression to the top 13 of the protrusion 12. The average of the height H of the protrusions 12 means the average of the height of the protrusions (protrusions in a projection view) 12p in a projection view when the coat layer 11 is projected on a plane perpendicular to the central axis of the honeycomb structure. More specifically, it is a value obtained as follows. From a microscope photograph of a cross section perpendicular to the central axis of the honeycomb structure, the thickness T (see FIG. 2A) of a coat layer in the portion where the coat layer is thinnest is measured. Then, with regard to a sample piece cut out to have a size of 10 mm×10 mm from the honeycomb structure, a coat layer in a cell is observed by a microscope along the central axial direction of the honeycomb structure. The image obtained by the microscope observation corresponds with a projection view (see FIG. 2B) when the coat layer is projected on the plane perpendicular to the central axis of the honeycomb structure. In this projection view, the portion corresponding with the coat layer 11 is determined as a coat layer lip, the portion corresponding with the protrusion 12 is determined as a projection 12$p$, and the portion corresponding with the top 13 of the protrusion is determined as a top 13$p$. The height of the protrusion 12$p$ of the coat layer lip observed above is determined as a value obtained by deducting T from the "height (height in the projection view) Ha from the surface of the substrate to the top 13$p$ of the protrusion". The average value of the heights of the protrusions 12$p$ in the projection view is determined as the average height of the protrusions 12 in the honeycomb structure 100. As the microscope, there may be employed a SEM (scanning electron microscope) with a scale or an optical microscope. Here, FIG. 2B is a projection view obtained by projecting a coat layer of the honeycomb structure of the present embodiment on a plane perpendicular to the central axis of the honeycomb structure.

The average interval between the protrusions 12 and 12 is preferably 30 μm to 10 mm, more preferably 50 to 500 μm, and particularly preferably 80 to 200 μm. When the average interval is below 30 μm, the protrusions develop a tendency to overlap each other to decrease a surface area of the coat layer. When the average interval is above 10 mm, the number of the protrusions on the surface of the coat layer decreases to decrease a surface area of the coat layer, and thereby a load amount may be insufficient when a catalyst is loaded on a surface of the coat layer. The average interval between the protrusions means a distance between the tops of the adjacent protrusions. More specifically, the average interval between the protrusions is a value obtained by forming 10 sample pieces each having a size of 10 mm×10 mm, enlarging and observing the surface of the coat layer of each of the sample pieces with a microscope or the like, measuring and averaging the intervals between the tops 13 of the five protrusions 12 per piece (average values at five points are calculated out for each sample piece), and further averaging the average values of the samples as the average value (average value of 10 sample pieces). As the microscope, a SEM with a scale or an optical microscope may be used.

FIGS. 3 to 6 are schematic views of enlarged protrusions of a coat layer in a cross section perpendicular to the central axis of a honeycomb structure of the present invention. Each of the protrusions 12 is preferably in a state that a part of the coat layer 11 is raised due to a space 21 present inside each of the protrusions 12. Such a structure of the protrusion 12$a$ can be obtained by applying a coat layer raw material containing a space former on partition walls of a porous substrate upon manufacturing, and then burning away a pore former. The average particle diameter of the space former is preferably 10 to 150 μm. The average particle diameter is a value measured by SEM observation. The average size (width) of the space 21 inside the protrusion is preferably 10 to 150 μm. When the average width of the space 21 inside the protrusion is below 10 μm, a pressure loss-reducing effect is hardly obtained; while, when it is above 150 μm, a defect is easily caused in the coat layer. Here, the size (width) of the space 21 inside the protrusion means the maximum length of the space. In addition, the average size (width) of the space 21 inside the protrusion is a value obtained by observing the sample pieces cut out to have a size of 10 mm×10 mm with a microscope and averaging the maximum length of each space appearing on the cross section of the protrusion with the number of the protrusions.

Figure 4:
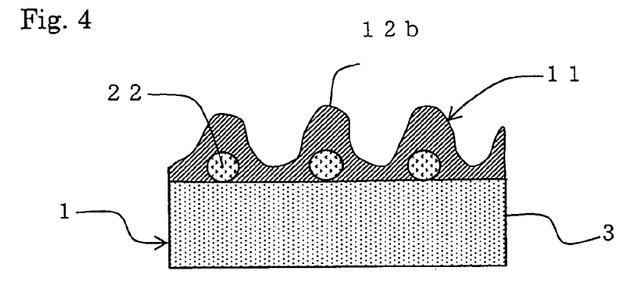
FIG. 4 is a schematic view of enlarged protrusions of a coat layer in a cross section perpendicular to the central axis of a honeycomb structure of the present invention.

As the protrusion 12$b$ shown in FIG. 4, the protrusion 12 is preferably in a state that a part of the coat layer 11 is raised due to a microparticle of a porous article 22 inside the protrusion 12. Such a structure of the protrusion 12$b$ can be obtained by applying a coat layer raw material containing microparticles of a porous article on partition walls of a porous substrate upon manufacturing. As the material for the porous article 22 is preferably ceramic having low thermal expansion coefficient and preferably the same material as that for the coat layer or the substrate. The average particle diameter of the porous article 22 used for manufacturing a honeycomb structure is preferably 10 to 150 μm. The average particle diameter is a value measured by SEM observation. The average size (width) of the space 21 inside the protrusion is preferably 10 to 150 μm. When the average width of the space 21 inside the protrusion is below 10 μm, a pressure loss-reducing effect is hardly obtained, while, when it is larger than 150 μm, a defect is easily caused in a coat layer.

Figure 5:
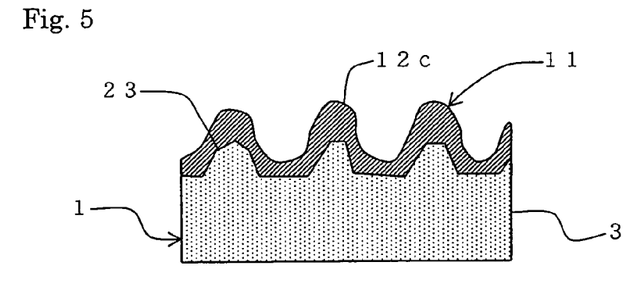
FIG. 5 is a schematic view of enlarged protrusions of a coat layer in a cross section perpendicular to the central axis of a honeycomb structure of the present invention.

As the protrusion 12$c$ shown in FIG. 5, the protrusion 12 is preferably in a state that a part of the coat layer 11 is raised due to the protrusion (protrusion of a partition wall) 23 formed on a surface of the partition wall 3. As a method for thus forming the protrusion 23 on the partition wall of the porous substrate, there may be employed a method where extrusion forming through a die having a groove formed therein is performed, or a method where a formed substrate is subjected to etching. The average height of the protrusions 23 of the partition walls is preferably 20 to 200 μm. The average height of the protrusions 23 of the partition walls is measured by a method of observing a cross section with a microscope. Ten or more sample pieces each having a length of 10 mm are observed the maximum height in each piece is averaged by the number of the sample pieces. When the alignment of the protrusions has regularity, it is necessary to cut without bias in consideration of the alignment. Increasing the length and/or the number of the sample pieces may be recommended as necessary according to the shape and the number of the protrusions to avoid too much difference from the average in the whole honeycomb structure. Since there is a low probability of having the largest portion (top) in that the cutting plane when the number of the protrusion is small, it is important to measure substantial height with confirming the correlation between the sample number and size and the measured value.

Figure 6:
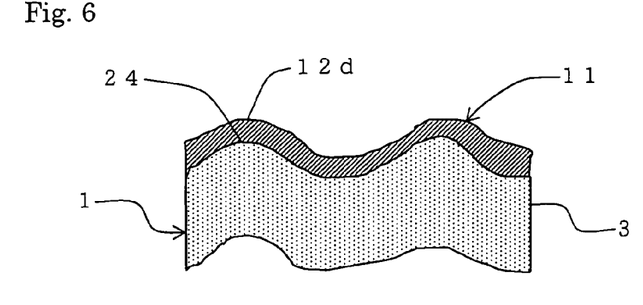
FIG. 6 is a schematic view of enlarged protrusions of a coat layer in a cross section perpendicular to the central axis of a honeycomb structure of the present invention.

As the protrusions 12$d$ shown in FIG. 6, the protrusions 12 have a corrugated shape (wavy shape) of the partition walls 3 and is preferably in a state that a part of the coat layer 11 is raised due to a mountain portion of the wavy shape (mountain portion of the partition wall) 24. As a method for thus forming the partition walls of the porous substrate in a wavy shape, there may be employed a method where extrusion forming is performed with intentionally varying the density of the formed article or a method where a wavy plate is rolled to give a cylindrical shape.

Figure 7:
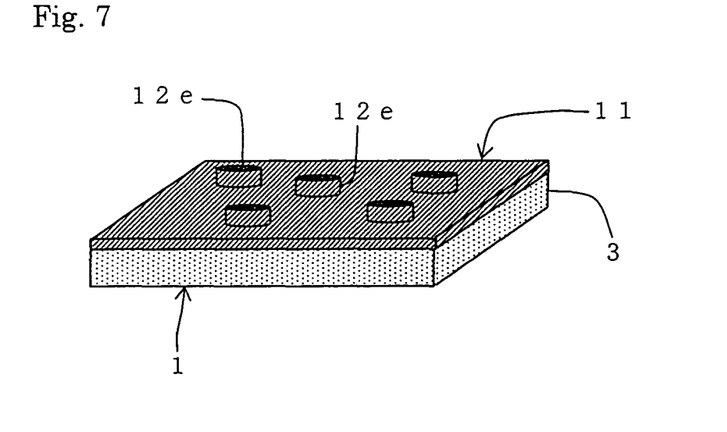
FIG. 7 is a perspective view schematically showing an enlarged part of a surface of a partition wall of a honeycomb structure of the present invention.
Figure 8:
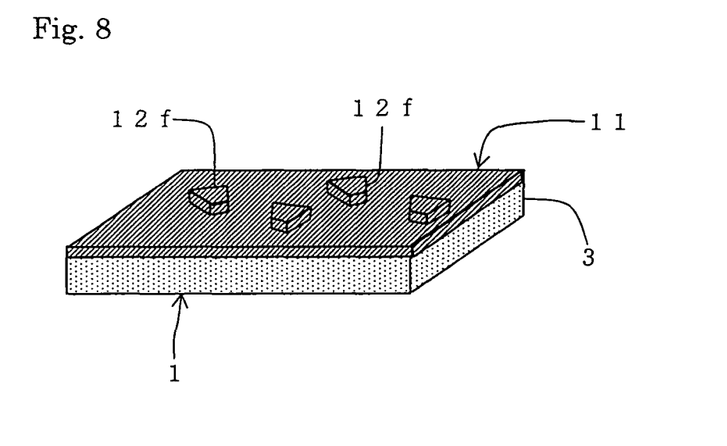
FIG. 8 is a perspective view schematically showing an enlarged part of a surface of a partition wall of a honeycomb structure of the present invention.
Figure 9:
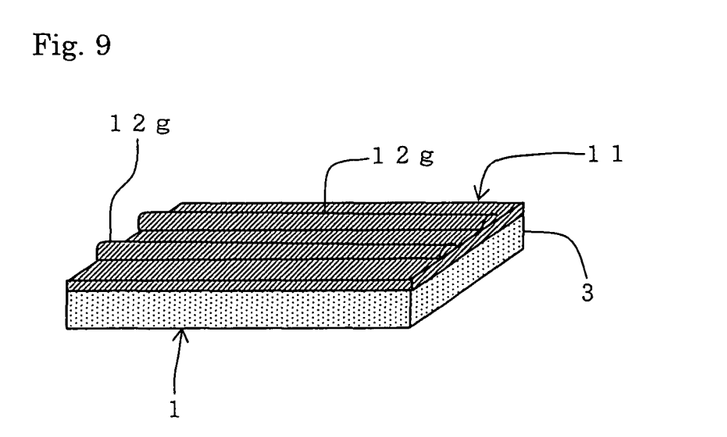
FIG. 9 is a perspective view schematically showing an enlarged part of a surface of a partition wall of a honeycomb structure of the present invention.

In addition, the protrusions 12 may have mountain shapes having unfixed shapes as shown in FIGS. 2A and 3 to 5, shapes of mountain portions of a corrugated shape as shown in FIG. 6, or a columnar shape as shown in FIGS. 7 and 8. The protrusion 12$e$ shown in FIG. 7 has a columnar shape having a circular bottom face, and the protrusion 12$f$ shown in FIG. 8 has a columnar shape having a polygonal (quadrangular)

bottom face. In addition, as the protrusion 12g shown in FIG. 9, a protrusion may have a ridge shape extending along a wall face of a partition wall. FIGS. 7 to 9 are perspective views each schematically showing an enlarged part of a surface of a partition wall of a honeycomb structure of the present invention.

In a honeycomb structure of the present invention, the coat layer 11 has an average pore diameter of preferably 0.1 to 20 µm, more preferably 1 to 15 µm, particularly preferably 10 to 15 µm. When the average pore diameter of the coat layer 11 is smaller than 0.1 µm, exhaust gas hardly passes through pores, and therefore the pressure loss may increase. In particular, in the case that a catalyst is loaded inside the pores of the coat layer, when the diameter is smaller than 10 µm, prone to be clogged with the catalyst, and exhaust gas hardly passes through the pores, and therefore the pressure loss may increase. When the average pore diameter is larger than 20 µm, particulate matter enters the pores to cause clogging of pores, and therefore the pressure loss may increase. The average pore diameter of the coat layer 11 is a value measured with a mercury porosimeter. Since it is necessary to measure pore diameters of only the coat layer, it is necessary to apply a resin or metal film on a face of a test piece other than the coat layer lest mercury should enter the test piece. From an image obtained by a SEM or the like, the pore diameters can be averaged by image processing.

The porosity of the coat layer 11 is preferably 40 to 85%, more preferably 50 to 75%. When it is below 40%, pressure loss increases, and thereby a treatable amount of exhaust gas may be reduced, while, when it is above 85%, a coat layer 11 is brittle and may be lost. The porosity of the coat layer 11 is measured by a mercury porosimeter. Since it is necessary to measure the porosity of only the coat layer, it is necessary to apply a resin or metal film on a face of a test piece other than the coat layer lest mercury should enter the test piece.

The surface area of the coat layer 11 is preferably 1.05 to 10 times, more preferably 1.2 to 2 times the surface area of a suppositional plane coat layer. When it is smaller than 1.05 times, the amount of catalyst loaded on a surface of the coat layer may be small, while, when it is larger than 10 times, pressure loss of exhaust gas flowing through the cells may increase. In addition, when it is larger than 2 times, there may be the case of reducing unevenness by loading the catalyst, thereby hardly obtaining an effect of increase in the surface area. The surface area of the coat layer 11 is a value calculated from a ratio of the demarcation line length of the uneven cross section to the straight line length of the observed portion by the observation of a cross section with a microscope. Ten sample pieces having a length of 10 mm are observed, and the length of unevenness of each sample piece is averaged to obtain 10 averages. When the alignment of the protrusions has regularity, it is necessary to cut without bias in consideration of the alignment. Increasing the length and/or the number of the sample pieces may be recommended as necessary according to the shape and the number of the protrusions to avoid too much difference from the average in the whole honeycomb structure. Since there is a low probability of having the largest portion (top) in the cutting plane when the number of the protrusion is small, it is important to measure substantial length of unevenness with confirming the correlation between the sample number and size and the measured value.

The thickness of the coat layer 11 is preferably 10 to 300 µm, more preferably 20 to 100 µm. When it is below 10 µm, the surface area of the coat layer is not increased, and the amount of the catalyst loaded on a surface of the coat layer may be small, while, when it is above 300 µm, pressure loss of exhaust gas flowing through the cells may increase. The thickness of the coat layer is a value measured by observing a cross section with a microscope. Ten sample pieces having a length of 10 mm are observed, and the thickness of the coat layer at ten points per piece is averaged, and the ten averages are further averaged.

Suitable examples of the material for forming the coat layer 11 include a material containing ceramic as the main component, heat resistant paper, and sintered metal. Specifically, in the case of a material containing ceramic as the main component, suitable examples of the ceramic include silicon carbide, cordierite, alumina titanate, sialon, mullite, silicon nitride, zirconium phosphate, zirconia, titania, alumina, silica, LAS (lithium aluminum silicate), and a combination of these components. Particularly suitable examples include ceramics such as silicon carbide, cordierite, mullite, silicon nitride, alumina, and alumina titanate in view of alkali resistant characteristics. Of these, oxide based ceramic is preferable also in view of costs. The same material as that for the substrate is particularly preferable in view of excellent thermal shock resistance.

The thermal expansion coefficient in the cell extension direction of the honeycomb structure 100 of the present embodiment at 40 to 800° C. is preferably $5.0 \times 10^{-6}/°$ C. or less, more preferably $1.2 \times 10^{-6}/°$ C. or less, particularly preferably $0.8 \times 10^{-6}/°$ C. or less. When it is $5.0 \times 10^{-6}/°$ C. or less, stress due to heat generation upon being exposed to high temperature exhaust gas can be suppressed within an acceptable range, and breakage of the honeycomb structure due to thermal stress can be inhibited. Though the thermal expansion coefficient is preferably as small as possible, the lower limit is about $1 \times 10^{-10}/°$ C.

Figure 10:
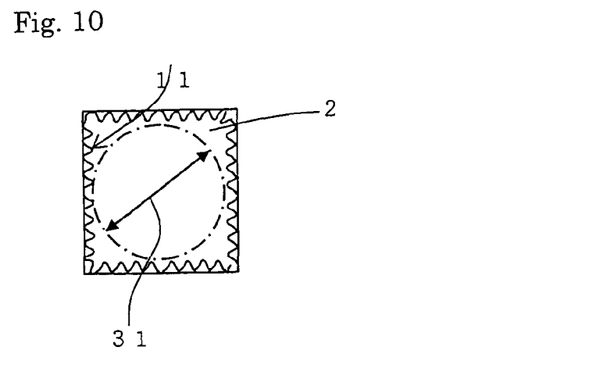
FIG. 10 is a schematic view showing a cross section perpendicular to the central axis of the cells, illustrating a hydraulic diameter of the cell.

Since the coat layer 11 is formed on the inner surface of the cells 2 (surface of the partition walls) in the honeycomb structure 100 of the present embodiment, the hydraulic diameter 31 of the cells 2 shown in FIG. 10 is smaller than the hydraulic diameter of the "cells of the porous substrate". The hydraulic diameter 31 of the cells 2 is preferably 0.72 to 0.96 times, more preferably 0.82 to 0.92 times that of the cells of the porous substrate 1. When it is smaller than 0.72 times, pressure loss of exhaust gas flowing through the cells may increase. When it is larger than 0.96, since it means the height of the protrusions 12 is small, and therefore depressions may be filled with the catalyst loaded on the surface of the coat layer to decrease the surface area. Here, the "hydraulic diameter" means the largest inscribed circle of the coat layer in the cell. The hydraulic diameter of the cells 2 is a value measured by microscope observation of a cross section of a cell viewed in the axial direction.

In the honeycomb structure 100 of the present embodiment, the porous substrate 1 has a honeycomb shape having porous partition walls 3 separating and forming a plurality of cells 2 functioning as fluid passages, and the average pore diameter of the partition walls 3 is preferably 5 to 100 µm, more preferably 10 to 40 µm. When it is below 5 µm, the pressure loss may be increased even in the case of little deposition of particulate matter, while, when it is above 100 µm, the honeycomb structure 100 may be brittle and have a loss. The average pore diameter of the partition walls 3 is measured with a mercury porosimeter. Since it is necessary to measure the pore diameter of only the substrate, it is necessary to apply a resin or metal film on a face of a test piece of the coat layer lest mercury should enter the coat layer. From an image obtained by a SEM or the like, the pore diameters can be averaged by image processing.

The porosity of the partition walls 3 is preferably 38 to 70%, more preferably 40 to 55%. When it is below 38%, pressure loss may increase, while, when it is above 70%, the honeycomb structure 100 may be brittle and have a loss. Further, when it is in the range from 40 to 55%, increase in pressure loss in the case of little deposition of particulate matter is little, and too much rise in temperature upon combusting and removing particulate matter is hardly caused preferably. The porosity of the partition walls 3 is measured with a mercury porosimeter. Since it is necessary to measure the porosity of only the substrate, it is necessary to apply a resin or a metal film on a face of a test piece of the coat layer lest mercury should enter the coat layer.

The thickness of the partition wall 3 is preferably 100 to 700 µm, more preferably 200 to 500 µm. When it is below 100 µm, the strength of the honeycomb structure 100 may decrease, while, when it is above 700 µm, pressure loss may increase when exhaust gas passes through the cells. The thickness of the partition walls 3 is measured by observing a cross section along the axial direction with a microscope.

The cell density of a cross section perpendicular to the central axis of the honeycomb structure 100 (porous substrate 1) is preferably 6 to 600 cpsi (0.9 to 93 cells/cm$^2$), more preferably 50 to 400 cpsi (7.8 to 62 cells/cm$^2$). When it is below 0.9 cells/cm$^2$, the strength of the honeycomb structure 100 may decrease, while, it is above 93 cells/cm$^2$, pressure loss may increase.

Though the cell shape of the honeycomb structure 100 is not particularly limited, it is preferably a polygon such as a triangle, a quadrangle, a pentagon, and a hexagon; a circle, an ellipse, a racetrack shape; a partially transformed shape thereof; or an irregular shape.

Suitable examples of the material constituting the honeycomb structure 1 (partition walls 3) of the present embodiment include a material containing ceramic as the main component, heat resistant paper, and sintered metal. Specifically, in the case of a material containing ceramic as the main component, suitable examples of the ceramic include silicon carbide, cordierite, alumina titanate, sialon, mullite, silicon nitride, zirconium phosphate, zirconia, titania, alumina, silica, LAS (lithium aluminum silicate), and a combination of these components. Particularly suitable examples include ceramics such as silicon carbide, cordierite, mullite, silicon nitride, alumina, and alumina titanate in view of alkali resistant characteristics. Of these, oxide based ceramic is preferable also in view of costs.

The thermal expansion coefficient in the cell extension direction of the honeycomb structure 1 of the present embodiment at 40 to 800° C. is preferably $5.0 \times 10^{-6}$/° C. or less, more preferably $1.2 \times 10^{-6}$/° C. or less, particularly preferably $0.8 \times 10^{-6}$/° C. or less. When it is $5.0 \times 10^{-6}$/° C. or less, stress due to heat generation upon being exposed to high temperature exhaust gas can be suppressed within an acceptable range, and breakage of the honeycomb structure due to thermal stress can be inhibited. Though the thermal expansion coefficient is preferably as small as possible, the lower limit is about $1 \times 10^{-10}$/° C.

Though the outer shape of the honeycomb structure 100 is not particularly limited, the shape may be a circular cylindrical shape, elliptic cylindrical shape, a cylindrical shape having a polygonal bottom face such as a quadrangular cylindrical shape, a cylindrical shape having a bottom face having an irregular shape, or the like. In addition, though the size of the honeycomb structure is not particularly limited, the length in the central axial direction is preferably 40 to 500 mm. For example, in the case that the outer shape of the honeycomb structure 100 is circular, the radius of the bottom face is preferably 50 to 500 mm.

In addition, the honeycomb structure 100 may have an outer peripheral wall located in the outermost periphery thereof. Incidentally, the outer peripheral wall may be a wall formed unitarily with the honeycomb structure upon forming or may be a cement coat wall formed by grinding the outer periphery of the honeycomb structure to have a predetermined shape and then applying cement or the like on the outer periphery.

In the honeycomb structure 100 of the present embodiment, it is preferable that predetermined cells each having a plugging portion on one end face and an opening on the other end face and the other cells each having an opening on one end face and a plugging portion on the other end face are alternately disposed to form a checkerwise pattern on each of the end faces by the plugged cells and the unplugged cells. Though there is no particular limitation on the material for the plugging portions with which openings of the cells are plugged, preferable examples of the material include alumina, cordierite, SiC, aluminum titanate, mullite, AlN, and $Si_2N_4$. Of these, cordierite, SiC, aluminum titanate, and mullite are preferable in that they have excellent thermal resistance and thermal shock resistance. In addition, it is more preferable that the material for the plugging portions is the same as that for the partition walls. The depth of the plugging portions in the cells from the end faces of the honeycomb structure is preferably 1 to 20 mm from the viewpoint of reducing pressure loss, increasing a catalyst effective area when a catalyst is loaded, and increasing strength though it is not particularly limited. Though the honeycomb structure 100 of the present embodiment is provided with plugging portions in the other end portion of each of the predetermined cells and on one end portion of each of the other cells, the position of the plugging portion of each cell is not limited to this case. That is, the honeycomb structure of the present invention has plugging portions with which a fluid entering in the honeycomb structure from the openings on one end face side of the other cells passes through the partition walls and is discharged from the openings on the other end face side of the predetermined cells. In other words, the plugging portions may be formed inside the cells besides end portions of the cells.

Figure 11A:
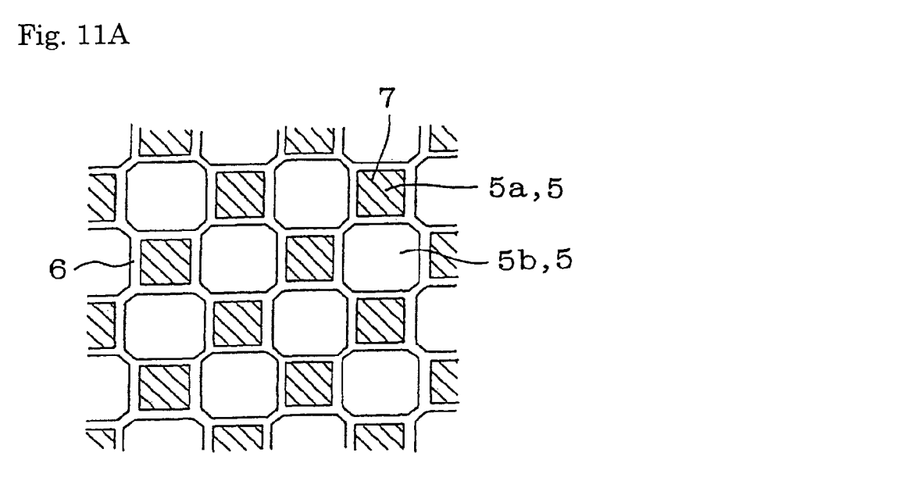
FIG. 11A is a plan view schematically showing one end face where the cells each having a larger cross-sectional area are open of another embodiment of a honeycomb structure of the present invention.
Figure 11B:
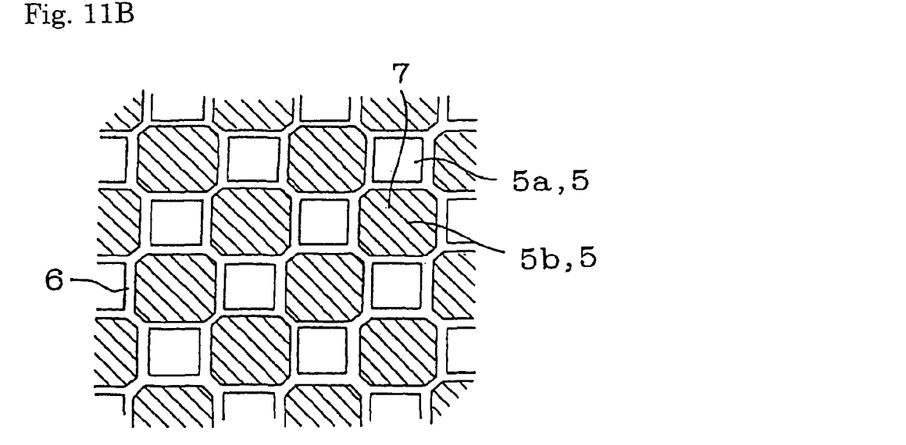
FIG. 11B is a plan view schematically showing another end face where the cells each having a smaller cross-sectional area are open.

In a honeycomb structure of the present invention, it is preferable that there is a relation of A<B where A (mm$^2$) is a total area of cross sections perpendicular to the longitudinal direction of the predetermined cells having plugged end portions on one side and where B (mm$^2$) is a total area of cross sections perpendicular to the longitudinal direction of the other cells having plugged end portions on the other side. Further, it is preferable that a cross section perpendicular to the longitudinal direction of the predetermined cells having plugged end portions on one side has a different shape from that of a cross section perpendicular to the longitudinal direction of the other cells having plugged end portions on the other side. When the honeycomb structure of the present invention is used as a DPF, generally, all the cells have the same cross sectional shape (generally, quadrangular shape) and the same opening area, the end portions of the cells are alternately plugged in such a manner that the end face in the exhaust gas inlet side and the end face in the exhaust gas outlet side have a checkerwise pattern, and the opening ratio of the inlet side end face is the same as that of the outlet side end face. However, as another embodiment of the honeycomb structure of the present invention shown in FIGS. 11A and 11B, as a preferable embodiment, the cross sections (cross sections perpendicular to the central axis) of the cells 5 have an octagonal shape and a quadrangular shape, and the cross-sectional area (area of a cross section perpendicular to the central axis) of the octagonal cells 5b is larger than that of the quadrangular cells 5a. FIG. 11A is a plan view schematically showing one end face where the cells having a larger cross-sectional area are open of another embodiment of a honeycomb structure of the present invention. FIG. 11B is a plan view schematically showing another end face where the cells each having a smaller cross-sectional area are open of another embodiment of a honeycomb structure of the present invention.

Another embodiment of a honeycomb structure of the present invention shown in FIGS. 11A and 11B is a cylindrical honeycomb structure where the cells 5 extending along the central axis are separated and formed by the partition walls 6, and the quadrangular cells 5a and the octagonal cells 5b having a larger opening area are alternately disposed in two directions perpendicular to each other on each end face. Plugging is performed with a plugging material 7 in the quadrangular cells 5a on one end face and in the octagonal cells 5b on the other end face. Thus, by making the octagonal cells 5b having a larger opening area open on one end face and making the quadrangular cells 5a having a smaller opening area open on the other end face, the opening ratio on one end face can be made higher than that on the other end face. By setting one end face on the exhaust gas inlet side and setting the other end face on the exhaust gas outlet side when the honeycomb structure is used as a DPF, the surface area of the coat layer is increased by the uneven structure of the coat layer in comparison with the DPF (plugged honeycomb structure having a single cross-sectional shape (e.g., all the cells have a quadrangular cross-sectional shape) and, in addition, a catalyst amount loaded on the surface of the coat layer can sufficiently be secured to effectively combust and remove particulate matter trapped on the surface of the coat layer. In addition, through increase in pressure loss when gas flows is a concern because of narrow cell passages due to protrusions of the coat layer, rise of the pressure loss can be suppressed by increasing a cross-sectional area of the cells open on the inlet end face.

In the honeycomb structure 100 of the present embodiment, it is preferable that a catalyst for combusting and removing particulate matter on the surface of the coat layer 11. Since the surface area of the coat layer 11 is increased due to the uneven structure of the coat layer, a sufficient amount of catalyst can be secured on the surface of the coat layer. In addition, particulate matter trapped on the surface of the coat layer 11 can effectively be combusted and removed.

A specific example of the catalyst contained in the catalyst layer loaded on the surface of the coat layer 11 is an oxidation catalyst for diesel engine exhaust gas purification. The oxidation catalyst for diesel engine exhaust gas purification contains noble metal. The noble metal is preferably one or more kinds selected from the group consisting of Pt, Rh, and Pd. The total amount of the noble metal is preferably 0.17 to 7.07 g per liter of the volume of the honeycomb structure. Further, a carrier coat contains, for example, a compound such as cerium oxide, zirconium oxide, and silica, or a combination thereof. The compound may be used together with a NOx selective reduction SCR catalyst or a NOx adsorber catalyst.

The NOx selective reduction SCR catalyst contains at least one kind selected from the group consisting of metal substituted zeolite, vanadium, titania, tungsten oxide, silver, and alumina. The NOx adsorber catalyst contains an alkali metal and/or an alkaline earth metal. Examples of the alkali metal include K, Na, and Li. Examples of the alkaline earth metal include Ca. Incidentally, the total amount of K, Na, Li, and Ca is preferably 0.5 g or more per liter of the volume of the honeycomb structure. When the catalyst for combusting and removing particulate matter is used together with the catalyst for oxidizing and removing NOx or the like, it is preferable to load the catalyst for combusting and removing particulate matter on a surface of the coat layer 11 and to load the catalyst for oxidizing and removing NOx or the like inside the pores of the coat layer 11 and/or inside the pores of the partition walls 3.

The honeycomb catalyst body of the present invention can be manufactured by loading a catalyst according to a manufacturing method based on a conventionally known method. Specifically, in the first place, catalyst slurry containing a catalyst is prepared. Next, the catalyst slurry is coated on pore surfaces of the partition walls of the honeycomb structure by the method of suction or the like. Then, the slurry is dried at room temperature or under heating conditions to obtain a honeycomb catalyst body of the present invention. In addition, the honeycomb structure and the honeycomb catalyst body of the present embodiment can effectively be used for various exhaust gas treatment systems. It is preferable that, when the catalyst for oxidizing and removing NOx or the like is loaded in the pores of the coat layers 11 and the partition walls 3, the average pore diameters of the coat layers 11 and the partition walls 3 are preferably within preferable ranges described above. Incidentally, in the present specification, a "catalyst" simply referred to with no particular explanation means a "catalyst for combusting and removing particulate matter".

The thickness of the oxidation catalyst loaded on a surface of the coat layer 11 is preferably 0.5 to 30 μm, more preferably 1 to 20 μm. When it is below 0.5 μm, the efficiency in combusting and removing particulate matter by the catalyst may be deteriorated, while, when it is above 30 μm, unevenness may be reduced to decrease the surface area. The amount of loaded oxidation catalyst is preferably 1 to 100 g, more preferably 10 to 50 g, per liter of the volume of the honeycomb structure. When it is below 1 g, the efficiency in combusting and removing particulate matter by the catalyst may be deteriorated, while, when it is above 100 g, pressure loss when exhaust gas flows through the cells may increase.

Next, a method for manufacturing one embodiment of a honeycomb structure of the present invention will be described. The honeycomb structure of the present embodiment can be manufactured by the following method, for example. However, a method for manufacturing the honeycomb structure of the present embodiment is not limited to the following method.

A porous substrate (honeycomb formed article) constituting a honeycomb structure of the present invention can be manufactured according to a conventionally known method for manufacturing a diesel particulate filter (DPF), for example. Therefore, for example, by suitably adjusting the chemical composition of the material, by suitably adjusting the particle size of the raw material, or by suitably adjusting the kind, particle size, addition amount, and the like when porous structure is obtained by using a pore former, porosity and pore size can be controlled within predetermined ranges.

Here, as shown in FIG. 5, when the protrusions 23 of the partition walls are formed on a surface of the partition walls 3 of the porous substrate, it is preferable to subject the partition walls to etching by spraying a seal material on the surfaces of the cells of the honeycomb formed article formed in advance before immersing the honeycomb formed article in etching liquid such as acid to inhibit the portion protected with the seal material from being etched. As shown in FIG. 9, when the protrusions 12g of the partition walls are formed on the surfaces of the partition walls 3 of the porous substrate 1, it is preferable to perform extrusion forming through a die having grooves formed therein.

In addition, as shown in FIG. 6, when the partition walls 3 of the porous substrate 1 are formed in a corrugated shape, it is preferable to perform extrusion forming with intentionally varying density of the formed article or to roll a corrugated plate into a cylindrical shape.

A predetermined amount of a powdered protrusion-forming material is sprayed on a honeycomb formed article before firing. Then, the honeycomb formed article is calcined to join the protrusion-forming material with the substrate. Then, a slurried coat material is allowed to flow on the surface to form a coat layer. Alternatively, as another method, coat liquid containing the protrusion-forming material dispersed therein in advance is directly allowed to flow in the honeycomb formed article to form a coat layer on the surface layer. In the case of forming a coat layer only on the inlet cell side, a mask is applied on an end face of a honeycomb formed article so that the coat liquid is allowed to flow only in the predetermined cells.

Next, it is preferable to plug both the end portions of the honeycomb formed article. Though there is no particular limitation on a method for plugging, for example, in the first place, a mask is applied on an end face on one end to alternately cover opening portions of the cells in such a manner that each end face has a checkerwise pattern. Then, plugging slurry containing a ceramic raw material, water, alcohol, and an organic binder is stored in a storage container. Then, the end portion having the mask is immersed in the plugging slurry in the storage container, thereby filling the plugging slurry into the opening portions of the cells without the mask to form plugging portions. For the other end portions, a mask is applied on the cells plugged on the one end side described above, and the plugging portions are formed in the same manner as the plugging on the one end side described above. Thus, the cells which are not plugged on the one end side are plugged on the other end side to having a checkerwise pattern also on the other end face. The plugging may be performed on a honeycomb fired article obtained by firing a honeycomb formed article. In this case, after the honeycomb fired article is plugged, it is fired again to obtain a porous substrate.

Next, it is preferable to dry a honeycomb formed article having plugging portions to obtain a honeycomb dried article. There is no particular limitation on a drying method, and there may be employed a known drying method such as hot air drying, microwave drying, dielectric drying, reduced pressure drying, vacuum drying, and freeze drying. Of these, a combination of hot air drying with microwave drying or dielectric drying is preferable in that the whole formed article can be dried quickly and uniformly.

Next, it is preferable to calcine the honeycomb dried article obtained above before full firing to obtain a calcined article. The "calcine" means to combust and remove organic matter (an organic binder, a dispersant, a pore former, and the like) in the honeycomb formed article. Generally, the combustion temperature of the organic binder is about 100 to 300° C., and the combustion temperature of the pore former is about 200 to 800° C. Therefore, the calcination temperature is about 200 to 1000° C. Though the calcination time is not particularly limited, it is generally about 10 to 100 hours.

Next, a porous substrate is obtained by firing (fully firing) the calcined article. In the present invention, "fully fire" means to sinter the forming raw material in the calcined article for densification to ensure predetermined strength. Since the firing conditions (temperature and time) are different depending on the kind of the forming raw material, suitable conditions are selected according to the kind. For example, when a cordierite raw material is fired, it is preferable to fire at 1410 to 1440° C. for about 3 to 200 hours.

In the above, formation of the coat layer and sintering of the honeycomb formed article were simultaneously performed. However, they may be performed separately in two steps. A coat layer is formed on a honeycomb porous substrate obtained by a generally-known manufacturing method to obtain a honeycomb structure. The coat layer is preferably obtained by using a raw material described as the material for the aforementioned coat layer (coat layer raw material), adding an additive to the coat layer raw material to obtain a coat layer-forming raw material, applying the coat layer-forming raw material on the inner wall surfaces (partition wall surfaces) of the cells of the porous substrate, drying the raw material, and firing the porous substrate with the raw material.

Examples of the additive include a dispersion medium, a pore former, an organic binder, and a dispersant.

Examples of the dispersion medium include water and alcohol.

Any pore former can be employed as long as it has a characteristic of flying and disappearing in the firing step, and an inorganic substance such as coke, a polymer compound such as a resin balloon, an organic substance such as starch, and the like can be used alone or in combination.

As the organic binder, there may be used hydroxypropylmethyl cellulose, methyl cellulose, hydroxyethyl cellulose, carboxylmethyl cellulose, polyvinyl alcohol, and the like. These may be used alone or in combination.

As the dispersant, ethyleneglycol, dextrin, fatty acid soap, polyalcohol, or the like may be used. They may be used alone or in combination.

Figure 3:
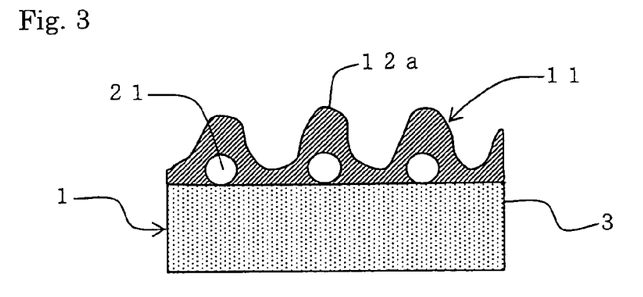
FIG. 3 is a schematic view of enlarged protrusions of a coat layer in a cross section perpendicular to the central axis of a honeycomb structure of the present invention.

As shown in FIG. 3, in the case of forming a space 21 in a protrusion 12a, it is preferable to add a space former as an additive to the raw material for the coat layer. As the material for the space former, a material usable as the above pore former is preferable. The average particle diameter of the space former is preferably 10 to 150 μm. The average particle diameter of the space former is measured by observing a cross section with a microscope.

In addition, as shown in FIG. 4, in the case of disposing a porous body 22 in the protrusion 12b, it is preferable to add a porous body to the coat layer raw material as an additive. The material for the porous body is not particularly limited, and a material containing ceramic as the main component is a suitable example. Specifically, in the case of a material containing ceramics as the main component, suitable examples of the ceramic include silicon carbide, cordierite, alumina titanate, sialon, mullite, silicon nitride, zirconium phosphate, zirconia, titania, alumina, silica, and LAS (lithium aluminum silicate) and a combination thereof. In particular, ceramics such as silicon carbide, cordierite, mullite, silicon nitride, alumina, and alumina titanate are suitable in view of alkali resistance. Of these, oxide type ceramics are suitable also in view of costs. The material is preferably the same as that for the coat layer because there is no mismatch regarding thermal expansion. The average particle diameter of the porous body is preferably 10 to 150 μm. The average particle diameter of the porous body is measured by observing a cross section with a microscope. The average pore diameter of the porous body is 1 to 100 μm. The average pore diameter of the porous body is measured by mercury porosimetry. The porosity of the porous body is preferably 35 to 80%. The porosity of the porous body is measured by mercury porosimetry.

In addition, as shown in FIG. 7, in the case of forming the protrusion 12e into a columnar shape having an elliptic bottom face, it is preferable that a plate-shaped porous material or a pore former such as carbon is punched out to have predetermined size and shape to use it as a protrusion-forming material.

In addition, as shown in FIG. 8, in the case of forming the protrusion 12f into a columnar shape having a polygonal (quadrangular) bottom face, it is preferable that a plate-shaped porous material or a pore former such as carbon is smashed to have predetermined size and shape to use it as a protrusion-forming material.

In addition, as shown in FIG. 9, in the case of forming the protrusion 12g into a ridge shape, starch is allowed to linearly flow, and a powdered protrusion-forming material is sprayed on the starch to form the protrusion linearly.

Examples of a method for applying a coat layer-forming raw material to the inner walls (partition walls) of the cells of the porous substrate include immersing using the surface tension and deposition of a to-be-coated substance mixed in liquid or a gel substance by filtration.

There is no particular limitation on a method for drying the coat layer-forming raw material applied on the inner walls of the cells, and there can be used a known drying method such as hot air drying, microwave drying, dielectric drying, reduced pressure drying, vacuum drying, and freeze drying. Of these, a drying method where hot air drying is combined with microwave drying or dielectric drying is preferable in that the applied coat layer-forming raw material can be dried quickly and uniformly.

It is preferable that the dried coat layer-forming raw material is calcined before full firing to combust and remove organic matter (an organic binder, a dispersant, a pore former, a space former, and the like) contained in the dried coat layer-forming raw material. Generally, the combustion temperature of the organic binder is about 100 to 300° C., and the combustion temperature of the pore former is about 200 to 800° C. Therefore, the calcination temperature is about 200 to 1000° C. Though the calcination time is not particularly limited, it is generally about 10 to 100 hours.

Next, the calcined coat layer-forming raw material is fired (fully fired) to obtain a coat layer. Since the firing conditions (temperature and time) are different depending on the kind of the forming raw material, suitable conditions are selected according to the kind.

There is no particular limitation on the method for loading a catalyst on the honeycomb structure of the present embodiment, and a known method can be employed for loading. For example, in the first place, catalyst slurry containing a predetermined catalyst is prepared. Next, the catalyst slurry is applied on a surface of the coat layer disposed on the partition wall of the honeycomb structure by extrusion or the like. Then, the slurry is dried at room temperature or under heating conditions to load the catalyst on the honeycomb structure.

EXAMPLE

Hereinbelow, the present invention will be described more specifically by Examples. However, the present invention is by no means limited to these Examples.

Example 1

To 100 parts by mass of a cordierite-forming raw material prepared by combining a plurality selected from talc, kaolin, calcined kaolin, alumina, calcium hydroxide, and silica at a predetermined ratio to obtain a chemical composition of 42 to 56% by mass of $SiO_2$ (silica), 0 to 45% by mass of $Al_2O_3$ (alumina), and 12 to 16% by mass of MgO (magnesia) were added 12 to 25 parts by mass of graphite as a pore former and 5 to 15 parts by mass of synthetic resin. After suitable amounts of methyl celluloses and a surfactant are added to them, water was added, followed by mixing them to prepare kneaded clay. After vacuum deairing the kneaded clay, the kneaded clay was extrusion-formed to obtain a honeycomb formed article. Next, the honeycomb formed article was fired to obtain a honeycomb fired article (porous substrate). The firing conditions were 1400 to 1430° C. and 10 hours.

Next, plugging was performed to the honeycomb fired article. A mask was alternately applied on cell opening portions on one end face of the honeycomb fired article to show a checkerwise pattern, and the end portion where the mask was applied was immersed in the plugging slurry containing a cordierite material as the ceramic raw material to form plugging portions alternately disposed in a checkerwise pattern. Further, For the other end portion of the honeycomb fired article, a mask was applied for the cells plugged on one end portion, and plugging portions were formed in the same manner as the formation of plugging portions on one end portion described above.

Into the cells of the honeycomb fired article, a gel substance containing water or alcohol containing the protrusion-forming material and an organic binder was filled, and pressure was applied. A protrusion-forming material in the gel was filtered by the honeycomb sintered article and sprinkled on a surface. Then, after an air blow, it was dried to bond the protrusion-forming material with the honeycomb substrate. As the protrusion-forming material, a resin having an average particle diameter of 50 μm was used. The average particle diameter was measured by using an optical microscope with a scale.

In the same manner, a gel substance containing cordierite microparticle and silica microparticles as coat layer components, water or alcohol, and an organic binder was filled into the cells, and pressure was applied. The cordierite microparticles and silica microparticles were filtrated by a honeycomb sintered article and deposited on a surface to cover the sintered article and the protrusion-forming material. Then, after an air blow, it was dried by hot air at 120° C. for 24 hours.

Then, the dried honeycomb fired article with a coat layer (unfired coat layer) was fired at 1430° C. for three hours to obtain a cylindrical honeycomb structure having a diameter of 190 mm and a length of 203 mm. The porous substrate in the obtained honeycomb structure had a cell density of 46.5 cells/cm² (300 cpsi), a thickness of 304.8 μm (12 mil). The porous substrate had an average pore diameter of 15 μm and a porosity of 52%. The coat layer had a thickness of 15 μm, a porosity of 70%, and the average pore diameter of 15 μm. The thickness of the coat layer was measured by cutting and observing. The porosity and the average pore diameter were measured with a commercial mercury porosimeter. A resin was embedded in a test piece of a coat layer except for the coat layer side, and a resin was embedded in a test piece of a substrate on a coat layer side.

Next, a catalyst was loaded on a honeycomb structure. Oxidation catalyst slurry was prepared. A layer of catalyst slurry was formed on a surface of the coat layer of a honeycomb structure by suction. Next, it was dried by heating. The amount of the catalyst per liter of the volume of the honeycomb structure was 20 g.

The honeycomb structure where a catalyst was loaded was measured for the average height of protrusions (average protrusion height), average interval between protrusions (average protrusion interval), surface area ratio, cell hydraulic diameter, pressure loss, and regeneration time ratio by the following methods. The results are shown in Table 1.

(Average Protrusion Height)

From the microscope photograph of a cross section perpendicular to the central axis of the honeycomb structure, the coat layer thickness T at the position where the coat layer was thinnest was measured. Then, regarding a sample piece cut out to have a size of 10 mm×10 mm of the honeycomb structure, a coat layer in a cell was observed with a microscope along the central axial direction of the honeycomb structure. The image obtained by the observation with the microscope corresponds with a projection view (see FIG. 2B) of a coat layer projected on a plane perpendicular to the central axis of a honeycomb structure. The height of the protrusion observed in the projection view (see FIG. 2B) was determined by deducting T from the "height from the surface of the substrate to the top of the protrusion". The average value of the height of the protrusions in the projection view was determined as the average height (average protrusion height) of the protrusions of the honeycomb structure. There was used an optical microscope with a scale.

(Average Interval Between Protrusions (Average Protrusion Interval))

A surface of a sample piece cut out to have a size of 10 mm×10 mm was enlarged and observed with a microscope. Ten pieces were observed, and protrusion intervals (interval between tops of the protrusions) of an arbitrary five positions per one piece were averaged. Thus, the average value for the ten sample pieces was obtained. There was used an optical microscope with a scale.

(Surface Area Ratio)

A cross section of a sample piece cut out to have a size of 10 mm×10 mm was enlarged and observed with a microscope. Ten pieces were observed, and uneven portion cross sectional length per one piece was measured, and the average uneven portion cross sectional length for the ten sample pieces averaged. The obtained "average uneven portion cross-sectional length" was used as the barometer, and the ratio of the "average uneven portion cross-sectional length" of the honeycomb structure of each Example when the "average uneven portion cross-sectional length" of the honeycomb structure of Comparative Example was employed as 1.00 was determined as a surface area ratio of the honeycomb structure of each Example. There was used an optical microscope with a scale.

(Cell Hydraulic Diameter)

A cross section of a sample piece cut out to have a size of 10 mm×10 mm was enlarged and observed with a microscope. Ten pieces were observed, and the average hydraulic diameter for 5 cells per one piece was measured and obtained, and 10 averages were further averaged. There was used an optical microscope with a scale.

(Pressure Loss Ratio)

Exhaust gas was allowed to flow into a honeycomb structure from an engine, and particulate matter was deposited on the honeycomb structure by 3 g/litter of a honeycomb structure. After that, air is allowed to flow into the honeycomb structure under conditions of 4.2 Nm³/min. at 170° C. The difference in pressure between the front and the back of the DPF at that time was measured to obtain pressure loss. Table 1 shows ratios of the measurement result of the honeycomb structure of each Example to the result of the honeycomb structure of Comparative Example 1 (as 1).

(Regeneration Time Ratio)

Exhaust gas was allowed to flow into a honeycomb structure from an engine, particulate matter is deposited on the honeycomb structure by 3 g/litter of a honeycomb structure. The honeycomb structure where the particulate matter was deposited by 3 (g/liter of the honeycomb structure) was heated to 570° C. by fuel injection from an exhaust injection, and time from the start of heating was measured when 80% by mass of the deposited particulate matter was combusted. The change in mass of particulate matter was obtained by deducting the mass of the honeycomb structure after being heated from the mass of the honeycomb structure before heating. Table 1 shows ratios of the measurement result of the honeycomb structure of each Example to the result of the honeycomb structure of Comparative Example 1 (as 1). The shorter the regeneration time ratio is, the better.

TABLE 1

| | Average unevenness height (μm) | Average protrusion interval (μm) | Surface area ratio | Hydraulic diameter (mm) | Pressure loss ratio | Regeneration time ratio |
|---|---|---|---|---|---|---|
| Example 1 | 30 | 50 | 1.05 | 1.08 | 0.76 | 0.95 |
| Example 2 | 50 | 80 | 1.26 | 1.03 | 0.64 | 0.79 |
| Example 3 | 150 | 150 | 2.00 | 0.83 | 0.95 | 0.50 |
| Example 4 | 100 | 200 | 1.60 | 0.93 | 0.52 | 0.63 |
| Example 5 | 50 | 500 | 1.25 | 1.03 | 0.64 | 0.80 |
| Example 6 | 50 | 80 | 1.48 | 1.25 | 0.48 | 0.68 |
| Example 7 | 100 | 200 | 1.73 | 1.15 | 0.40 | 0.58 |
| Comp. Ex. 1 | — | — | 1.00 | 1.13 | 1.00 | 1.00 |

Example 2

A porous substrate was manufactured in the same manner as in Example 1. A honeycomb structure having a catalyst loaded thereon was manufactured in the same manner as in Example 1 except that the particle size and the amount of the protrusion-forming material were adjusted. The coat layer obtained had a thickness of 15 μm, a porosity of 70%, and an average pore diameter of 15 μm. In the same manner as in Example 1, the average height of the protrusions (average protrusion height) average interval between the protrusions (average protrusion interval), surface area ratio, cell hydraulic diameter, pressure loss ratio, and regeneration time ratio were measured. The results are shown in Table 1.

Example 3

The porous substrate was manufactured in the same manner as in Example 1. A honeycomb structure having a catalyst loaded thereon was manufactured in the same manner as in Example 1 except that the particle size and the amount of the protrusion-forming material were adjusted. The coat layer obtained had a thickness of 15 μm, a porosity of 70%, and an average pore diameter of 15 μm. In the same manner as in Example 1, the average height of the protrusions (average protrusion height) average interval between the protrusions (average protrusion interval), surface area ratio, cell hydraulic diameter, pressure loss ratio, and regeneration time ratio were measured. The results are shown in Table 1.

Example 4

The porous substrate was manufactured in the same manner as in Example 1. A honeycomb structure having a catalyst loaded thereon was manufactured in the same manner as in Example 1 except that the particle size and the amount of the protrusion-forming material were adjusted. The coat layer obtained had a thickness of 15 μm, a porosity of 70%, and an average pore diameter of 15 μm. In the same manner as in Example 1, the average height of the protrusions (average protrusion height) average interval between the protrusions (average protrusion interval), surface area ratio, cell hydraulic diameter, pressure loss ratio, and regeneration time ratio were measured. The results are shown in Table 1.

Example 5

The porous substrate was manufactured in the same manner as in Example 1. A honeycomb structure having a catalyst loaded thereon was manufactured in the same manner as in Example 1 except that the particle size and the amount of the protrusion-forming material were adjusted. The coat layer obtained had a thickness of 15 μm, a porosity of 70%, and an average pore diameter of 15 μm. In the same manner as in Example 1, the average height of the protrusions (average protrusion height) average interval between the protrusions (average protrusion interval), surface area ratio, cell hydraulic diameter, pressure loss ratio, and regeneration time ratio were measured. The results are shown in Table 1.

Comparative Example 1

The porous substrate was manufactured in the same manner as in Example 1. Without forming a coat layer, a catalyst was loaded on surfaces of the partition walls in the same manner as in Example 1 to manufacture a honeycomb structure where a catalyst is loaded. In the same manner as in Example 1, the surface area ratio, cell hydraulic diameter, pressure loss ratio, and regeneration time ratio were measured. The results are shown in Table 1.

As shown in Table 1, it can be understood that each of the honeycomb structures in Examples 1 to 5 has a small pressure loss in comparison with the Comparative Example 1, and particulate matter can be combusted and removed in a short period of time.

Example 6

There was formed a porous substrate having different cross-sectional areas (areas of cross-sections perpendicular to the longitudinal direction) between the predetermined cells 5a and the other cells 5b alternately arranged as shown in FIGS. 11A and 11B, and one end portion of each of the predetermined cells 5a and the other end portion of each of the other cells 5b were plugged to manufacture a honeycomb structure having a catalyst loaded thereon in the same manner as in Example 1 except that the particle size and the amount of the protrusion-forming material were adjusted. Incidentally, the cross-sectional shape of the predetermined cells 5a was quadrangular, and the cross-sectional shape of the other cells 5b was octagonal. In addition, the predetermined cells 5a (cells having small cross-sectional area and plugged in an end portion on gas inlet side) had an area of 1.02 mm² of a cross-section perpendicular to the longitudinal direction, and the other cells 5b (cells having large cross-sectional area and plugged in an end portion on the gas outlet side) had an area of 1.82 mm² of a cross-section perpendicular to the longitudinal direction. In the same manner as in Example 1, the average height of protrusions (average protrusion height), average interval between the protrusions (average protrusion interval), surface area ratio, cell hydraulic diameter, pressure loss ratio, and regeneration time ratio were measured. The results are shown in Table 1.

Example 7

A honeycomb structure having a catalyst loaded thereon was manufactured in the same manner as in Example 6 except that the particle size and the amount of the protrusion-forming material were adjusted. In the same manner as in Example 1, the average height of protrusions (average protrusion height), average interval between the protrusions (average protrusion interval), surface area ratio, cell hydraulic diameter, pressure loss ratio, and regeneration time ratio were measured. The results are shown in Table 1.

As shown in Table 1, it can be understood that pressure loss of each of the honeycomb structures of Examples 6 and 7 is further smaller than that of each of the honeycomb structures of Examples 1 to 5. In addition, it can be understood that particulate matter can be combusted and removed in a short period of time.

A honeycomb structure of the present invention can inhibit the pressure loss from increasing upon trapping particulate matter in exhaust gas and can effectively combust and remove the trapped particulate matter. Therefore, a honeycomb structure of the present invention can be used for trapping and removing particulate matter contained in exhaust gas discharged from, for example, an automobile engine, a construction machine engine, an industrial stationary engine, or a forming appliance.

What is claimed is:
1. A honeycomb structure comprising:
a porous substrate having porous partition walls separating and forming a plurality of cells functioning as fluid passages;
a porous coat layer disposed on a surface of the partition walls to inhibit microparticles from entering, a surface of the coat layer having an uneven shape with a greater exposed surface area than an exposed surface area of a coat layer that is (1) applied to a flat partition wall, and (2) formed from a composition lacking protrusion forming components; and
plugging portions for plugging cells so that a fluid flowing into the structure from opening portions on one end side of predetermined cells may pass through the partition walls and flow out from opening portions on the other side of the other cells to allow the fluid to flow through the partition walls and the coat layer,
wherein an average height of protrusions of the uneven shape of the coat layer is 20 to 300 μm and wherein an average interval between the protrusions is 30 μm to 10 mm.
2. The honeycomb structure according to claim 1, wherein the coat layer has an average pore diameter of 0.1 to 20 μm.
3. The honeycomb structure according to claim 1, wherein the surface area of the coat layer is 1.05 to 10 times the surface area of a suppositional planar coat layer.
4. The honeycomb structure according to claim 1, wherein a hydraulic diameter of the cells is 0.72 to 0.96 times a hydraulic diameter of the porous substrate.
5. The honeycomb structure according to claim 1, wherein the partition walls of the porous substrate has an average pore size of 1 to 100 μm.
6. The honeycomb structure according to claim 1, wherein a catalyst is loaded on the surface of the coat layer.
7. The honeycomb structure according to claim 1, having a relation of A<B where A is a total area of a cross section perpendicular to the longitudinal direction of the predetermined cells having plugged end portions on one side and where B is a total area of a cross section perpendicular to the longitudinal direction of the other cells having plugged end portions on the other side.
8. The honeycomb structure according to claim 1, wherein a cross section perpendicular to the longitudinal direction of the predetermined cells having plugged end portions on a first side has a different shape from that of a cross section perpendicular to the longitudinal direction of the other cells having plugged end portions on a second side.

9. The honeycomb structure according to claim 1, wherein the porous partition walls include protrusion members that cause protrusions to form in the porous coat layer, the protrusions contributing to the uneven shape.

10. The honeycomb structure according to claim 1, wherein the composition from which the porous coat layer is formed includes protrusion-forming components that cause protrusions to form in the porous coat layer, the protrusions contributing to the uneven shape.

11. The honeycomb structure according to claim 1, wherein the composition from which the porous coat layer is formed includes combustible protrusion-forming components that cause protrusions to form in the porous coat layer, the protrusions contributing to the uneven shape.

12. The honeycomb structure according to claim 1, wherein the uneven shape is formed by protrusion-forming members that are outside the porous coat layer or is formed by a protrusion-forming component within the coating composition.

* * * * *